(12) United States Patent
Jung et al.

(10) Patent No.: US 9,325,980 B2
(45) Date of Patent: Apr. 26, 2016

(54) 3D DISPLAY PANEL AND 3D DISPLAY APPARATUS USING THE SAME AND DRIVING METHOD THEREOF

(75) Inventors: Jong-hoon Jung, Suwon-si (KR); Dae-sik Kim, Hwaseong-si (KR); Kyung-hoon Cha, Yongin-si (KR); Ho-seop Lee, Seongnam-si (KR); Young-ji Ko, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 211 days.

(21) Appl. No.: 13/267,502

(22) Filed: Oct. 6, 2011

(65) Prior Publication Data

US 2012/0086712 A1 Apr. 12, 2012

Related U.S. Application Data

(60) Provisional application No. 61/390,258, filed on Oct. 6, 2010.

(30) Foreign Application Priority Data

Jan. 31, 2011 (KR) .................. 10-2011-0009343

(51) Int. Cl.
*G09G 3/36* (2006.01)
*H04N 13/04* (2006.01)

(52) U.S. Cl.
CPC ....... *H04N 13/0438* (2013.01); *H04N 13/0497* (2013.01)

(58) Field of Classification Search
CPC .............. H04N 13/00; H04N 13/0007; H04N 13/0431; H04N 13/0438; H04N 13/0434; H04N 2013/0074; H04N 13/044; H04N 5/359; G02B 27/22; G02B 27/2264; G09G 3/003; G09G 3/20; G09G 3/342; G09G 2310/024; G09G 2320/0209

See application file for complete search history.

(56) References Cited

U.S. PATENT DOCUMENTS 4,792,850 A * 12/1988 Liptoh et al. .................. 348/57
4,884,876 A * 12/1989 Lipton et al. .................. 349/33
(Continued)

FOREIGN PATENT DOCUMENTS

CN 1916692 A 2/2007
JP 2003-202519 A 7/2003
(Continued)

OTHER PUBLICATIONS

International Search Report (PCT/ISA/210) and Written Opinion (PCT/ISA/237) issued Mar. 28, 2012 in counterpart International Application No. PCT/KR2011/007288.
(Continued)

*Primary Examiner* — Amare Mengistu
*Assistant Examiner* — Crystal A Mathews
(74) *Attorney, Agent, or Firm* — Sughrue Mion, PLLC

(57) ABSTRACT

A three-dimensional (3D) display panel, a 3D display apparatus using the same, and a driving method thereof are provided. The 3D display apparatus includes: an image display panel which displays an image; a phase shift panel which alternately shifts a polarization direction of light outputted from the image display panel; a backlight unit which provides a backlight; and a control unit which turns off the backlight unit during a crosstalk period where the phase shift panel performs the shift operation and to turn on the backlight unit for a stabilization period after the crosstalk period.

20 Claims, 7 Drawing Sheets

(56) References Cited

U.S. PATENT DOCUMENTS

| | | | |
|---|---|---|---|
| 6,359,664 B1 | 3/2002 | Faris | |
| 6,801,282 B2* | 10/2004 | Suzuki | 349/119 |
| 7,495,385 B2* | 2/2009 | Lee et al. | 313/504 |
| 8,054,329 B2 | 11/2011 | Shestak et al. | |
| 8,339,341 B2* | 12/2012 | Ishiguchi et al. | 345/87 |
| 9,025,013 B2* | 5/2015 | Jung | G09G 3/003 348/53 |
| 9,030,537 B2 | 5/2015 | Nakahata et al. | |
| 2002/0041346 A1* | 4/2002 | Faris et al. | 349/16 |
| 2005/0219188 A1* | 10/2005 | Kawabe et al. | 345/94 |
| 2006/0181503 A1* | 8/2006 | Feng | 345/102 |
| 2006/0291053 A1* | 12/2006 | Robinson et al. | 359/465 |
| 2007/0008406 A1* | 1/2007 | Shestak et al. | 348/58 |
| 2007/0126691 A1* | 6/2007 | Lin et al. | 345/102 |
| 2007/0195163 A1* | 8/2007 | Chestak et al. | 348/58 |
| 2008/0180385 A1* | 7/2008 | Yoshida et al. | 345/102 |
| 2008/0246897 A1* | 10/2008 | Gaudreau | 349/15 |
| 2008/0297592 A1* | 12/2008 | Oyamada et al. | 348/51 |
| 2008/0316303 A1* | 12/2008 | Chiu et al. | 348/51 |
| 2009/0009508 A1* | 1/2009 | Koo et al. | 345/214 |
| 2009/0040402 A1* | 2/2009 | Tomita et al. | 349/15 |
| 2009/0109247 A1* | 4/2009 | Kimura | 345/690 |
| 2009/0184890 A1* | 7/2009 | Cowan et al. | 345/32 |
| 2010/0066820 A1* | 3/2010 | Park | G09G 3/003 348/53 |
| 2010/0207960 A1* | 8/2010 | Kimpe et al. | 345/618 |
| 2010/0225750 A1* | 9/2010 | Nakahata et al. | 348/56 |
| 2010/0231699 A1 | 9/2010 | Jalbout et al. | |
| 2010/0238274 A1* | 9/2010 | Kim et al. | 348/51 |
| 2010/0289974 A1* | 11/2010 | Kim et al. | 349/15 |
| 2010/0296059 A1* | 11/2010 | Sharp | 353/8 |
| 2011/0018983 A1* | 1/2011 | Kim | G02B 27/2264 348/56 |
| 2011/0032439 A1* | 2/2011 | Robinson et al. | 349/15 |
| 2011/0074938 A1* | 3/2011 | Nakahata | 348/56 |
| 2011/0090321 A1* | 4/2011 | Nakagawa et al. | 348/51 |
| 2011/0096146 A1* | 4/2011 | Hulyalkar et al. | 348/43 |
| 2011/0109733 A1* | 5/2011 | Kim et al. | 348/56 |
| 2011/0122238 A1* | 5/2011 | Hulvey et al. | 348/56 |
| 2011/0157165 A1 | 6/2011 | Jung et al. | |
| 2011/0169821 A1* | 7/2011 | Ishiguchi | 345/419 |
| 2011/0205625 A1* | 8/2011 | Auld | 359/465 |
| 2011/0210964 A1* | 9/2011 | Chiu et al. | 345/419 |
| 2011/0261173 A1* | 10/2011 | Lin et al. | 348/57 |
| 2011/0267341 A1* | 11/2011 | Jung | G09G 3/003 345/419 |
| 2011/0273439 A1* | 11/2011 | Son et al. | 345/419 |
| 2011/0292184 A1* | 12/2011 | de Greef | 348/51 |
| 2013/0093804 A1* | 4/2013 | Ninan | 345/690 |

FOREIGN PATENT DOCUMENTS

| | | |
|---|---|---|
| JP | 2010-210712 A | 9/2010 |
| WO | 01/40909 A1 | 6/2001 |
| WO | 2009/069026 A2 | 6/2009 |

OTHER PUBLICATIONS

Communication dated Feb. 28, 2015 issued by the State Intellectual Property Office of the People's Republic of China in counterpart Chinese Patent Application No. 201180048432.4.

Communication dated Apr. 28, 2015 issued by the Japanese Patent Office in counterpart Japanese Patent Application No. 2013-532716.

Communication dated Sep. 15, 2015 issued by the European Patent Office in counterpart European Patent Application No. 11830865.9.

Communication dated Nov. 4, 2015 issued by the Japanese Patent Office in counterpart Japanese Patent Application No. 2013-532716.

Communication dated Nov. 12, 2015 issued by the State Intellectual Property Office of the People's Republic of China in counterpart Chinese Patent Application No. 201180048432.4.

* cited by examiner

3D DISPLAY PANEL AND 3D DISPLAY APPARATUS USING THE SAME AND DRIVING METHOD THEREOF

CROSS-REFERENCE TO RELATED APPLICATIONS

This application claims the benefit of U.S. Provisional Patent Application No. 61/390,258, filed Oct. 6, 2010, and claims priority from Korean Patent Application No. 10-2011-0009343, filed Jan. 31, 2011 in the Korean Intellectual Property Office, the disclosures of which are incorporated herein by reference in their entireties.

BACKGROUND

1. Field

Apparatuses and methods consistent with exemplary embodiments relate to a three-dimensional (3D) display panel and a 3D display apparatus using the same and a driving method thereof. More particularly, apparatuses and methods consistent with exemplary embodiments relate to a polarization type 3D display panel and a 3D display apparatus using the same and a driving method thereof.

2. Description of the Related Art

Recently, due to expanding three-dimensional (3D) technologies, efforts to develop technologies capable of watching 3D contents even in a television (TV) for home use, a mobile terminal, etc., are increasing.

To allow a user to feel a 3D effect, a 3D display apparatus adjusts a disparity between objects to give a feeling of depth thereto.

The 3D display apparatus may be classified into a glass type and a non-glass type according to whether or not the user wears eyeglasses while viewing 3D content displayed by the display apparatus. The non-glass type is a type in which the display apparatus converts image signals into multi-view images and outputs the multi-view images thus to allow the user to feel a 3D effect without the use of glasses. The glass type is a type in which the display apparatus alternately displays a left eye image and a right eye image, to enable a left eye and a right eye of the user to recognize the left eye image and the right eye image, respectively, thus allowing the user to feel the 3D effect due to the disparity between the left eye image and the right eye image.

The glass type 3D display apparatus may be classified into a shutter glass type and a polarization type. The shutter glass type is a type in which shutters of left and right glasses in the glasses are switched to turn on the left glass when the left eye image is displayed and to turn on the right eye glass when the right eye image is displayed. The polarization type is a type in which a polarization direction of light outputted from the display apparatus is alternately shifted at an angle of 0 degree or 90 degrees for users who wear glasses with different polarization directions.

The shutter glass type is generally used in recent TVs for home use, but has a disadvantage in that the eye glasses are relatively expensive, as compared to the polarization type. That is, the polarization type has an advantage in that the glasses are relatively cheap.

However, if a polarization shift occurs during a change between different types of images, there may exist a crosstalk period in which both the left eye image and the right eye image are inputted into each eye of the user until the shift is completed. According to this, a problem may occur in that a picture in which the left eye image and the right eye image are overlapped with each other and distorted is shown, thereby deteriorating a satisfaction of the user.

Accordingly, there is a need for developing a technology capable of more effectively using the polarization method without such a problem.

SUMMARY

Exemplary embodiments overcome the above disadvantages and other disadvantages not described above. Also, an exemplary embodiment is not required to overcome the disadvantages described above, and an exemplary embodiment may not overcome any of the problems described above.

One or more exemplary embodiments relate to a three-dimensional (3D) display panel that uses a polarization method, but can improve a satisfaction of a user, and a 3D display apparatus using the same and a driving method thereof.

According to an aspect of an exemplary embodiment, there is provided a 3D display apparatus including: an image display panel which displays an image; a phase shift panel which performs a shift operation to alternately shift a polarization direction of light outputted from the image display panel; a backlight unit which provides a backlight; and a control unit which turns off the backlight unit during a crosstalk period when the phase shift panel performs the shift operation and to turn on the backlight unit during a stabilization period after the crosstalk period.

Here, an operating frequency of the image display panel may be larger than an operating frequency of the phase shift panel.

Further, the phase shift panel may perform the shift operation by a frame unit.

The 3D display apparatus may further include a phase shift panel driving unit which overdrives the phase shift panel for a predetermined time from a point of time where the phase shift panel begins performing the shift operation.

Also, an operating frequency of the phase shift panel may be 120 Hz, and an operating frequency of the image display panel may be 180 Hz, 240 Hz, 360 Hz or 480 Hz.

Here, the image display panel may alternately output a left eye image and a right eye image, and the phase shift panel may shift the polarization direction of the light to a first polarization state from a point of time when the left eye image is displayed and may shift the polarization direction to a second polarization state vertical to the first polarization state from a point of time when the right eye image is displayed.

According to an aspect of another exemplary embodiment, there is provided a 3D display panel including: an image display panel which alternately outputs a left eye image and a right eye image; a phase shift panel which performs a shift operation to shift a polarization direction of light outputted from the image display panel to a first polarization state from a point of time when the left eye image is displayed and to shift a polarization direction to a second polarization state from a point of time when the right eye image is displayed; and a backlight unit operable to be turned off during a crosstalk period when the phase shift panel performs the shift operation and to be turned on during a stabilization period after the crosstalk period.

Here, an operating frequency of the image display panel may be larger than an operating frequency of the phase shift panel.

Further, the phase shift panel may perform the shift operation by a frame unit.

Moreover, the phase shift panel may be overdriven for a predetermined time from a point of time when the phase shift panel begins performing the shift operation.

Also, an operating frequency of the phase shift panel may be 120 Hz, and an operating frequency of the image display panel may be 180 Hz, 240 Hz, 360 Hz or 480 Hz.

According to an aspect of another exemplary embodiment, there is provided a driving method of a 3D display apparatus having an image display panel, a phase shift panel which performs a shift operation to alternately shift a polarization direction of light outputted from the image display panel, and a backlight unit, the method including: turning off the backlight unit during a crosstalk period when the phase shift panel performs the shift operation, and turning on the backlight unit when the image display panel finishes the phase shift operation to enter a stabilization period.

Here, the phase shift panel may perform the shift operation by a frame unit.

The driving method may further include overdriving the phase shift panel for a predetermined time when the phase shift panel begins performing the shift operation.

Further, an operating frequency of the phase shift panel may be 120 Hz, and an operating frequency of the image display panel may be 180 Hz, 240 Hz, 360 Hz or 480 Hz.

Also, the driving method may further include alternately displaying a left eye image and a right eye image on the image display panel, and shifting the polarization direction of the light to a first polarization state from a point of time when the left eye image is displayed and shifting the polarization direction of the light to a second polarization state vertical to the first polarization state from a point of time when the right eye image is displayed.

According to an aspect of another exemplary embodiment, there is provided a backlight unit for a 3D display apparatus having an image display panel and a phase shift panel which performs a shift operation to alternately shift a polarization direction of light outputted from the image display panel, the backlight unit including: a light source which provides a backlight for the image display panel; and a control unit which turns off the light source during a crosstalk period corresponding to when the phase shift panel performs the shift operation, and which turns on the light source during a stabilization period after the crosstalk period.

According to an aspect of another exemplary embodiment, there is provided a 3D display control apparatus for controlling a 3D display apparatus having an image display panel, a phase shift panel which performs a shift operation to alternately shift a polarization direction of light outputted from the image display panel, and a backlight unit, the control apparatus including: a backlight driving unit which outputs a control signal to turn off the backlight unit during a crosstalk period corresponding to when the phase shift panel performs the shift operation, and to turn on the light source during a stabilization period after the crosstalk period.

As described above, according to the aspects of one or more exemplary embodiments, users can effectively watch 3D display type contents with glasses using a polarization method.

BRIEF DESCRIPTION OF THE DRAWINGS

The above and/or other aspects will become more apparent by describing certain exemplary embodiments with reference to the accompanying drawings, in which.

DETAILED DESCRIPTION OF EXEMPLARY EMBODIMENTS

Exemplary embodiments are described in greater detail below with reference to the accompanying drawings.

Figure 1:
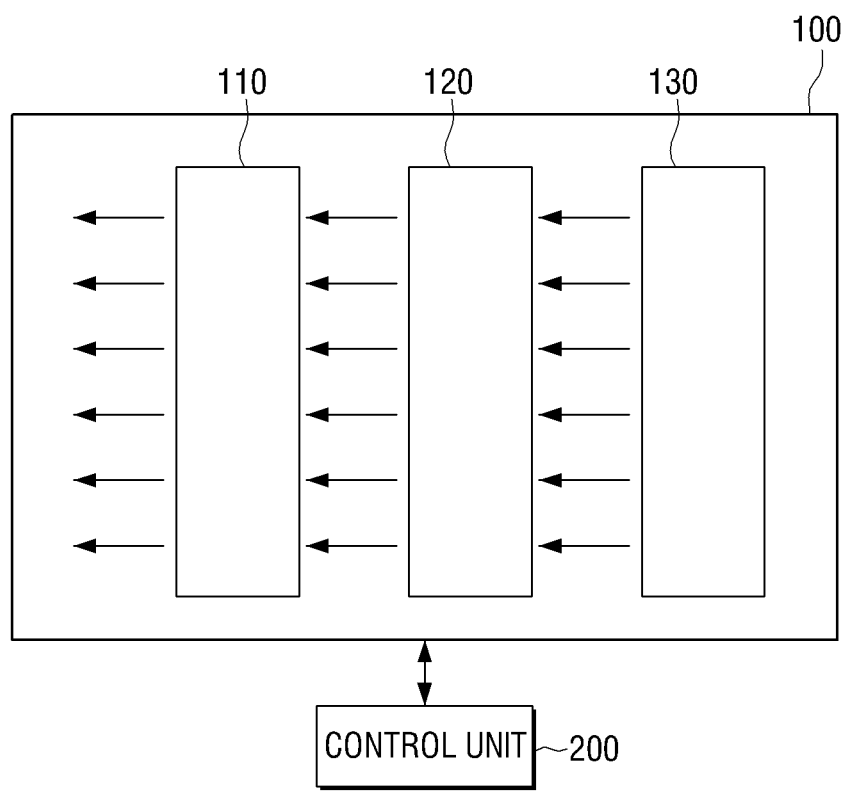
FIG. 1 is a block diagram showing a configuration of a three-dimensional (3D) display panel and a 3D display apparatus using the same, according to an exemplary embodiment.

FIG. 1 is a block diagram showing a configuration of a three-dimensional (3D) display apparatus according to an exemplary embodiment. Referring to FIG. 1, the 3D display apparatus includes a 3D display panel 100 and a control unit 200. It is understood that the 3D display apparatus of the present exemplary embodiment is not limited to a television (TV), and may be also embodied as various display apparatuses, such as a notebook personal computer (PC), a monitor, a mobile phone, a personal digital assistant (PDA), an electronic picture frame, an electronic book, etc.

The 3D display panel 100 includes a phase shift panel 110, an image display panel 120, and a backlight unit 130.

The image display panel 120 is a panel which displays an image. To be specific, the image display panel 120 alternately displays a left eye image and a right eye image. Here, the left eye image and the right eye image are images that, for example, may be produced by photographing a same subject from different angles. In other words, the left eye image and the right eye image may be images in which the subject is photographed in a state where respective lenses are spaced corresponding to a distance between a left eye and a right eye of a user, thereby causing the subject to be produced to have a disparity in the respective images. However, it is understood that one or more exemplary embodiments are not limited to the images being photographed as described above. For example, according to another exemplary embodiment, a two-dimensional image may be converted into a left eye image and a right eye image. An arrangement pattern of the left eye image and the right eye image may be differently determined according to an operating frequency or the like. In other words, each image may be repeatedly arranged plural times, such as an order of "a left eye image, a left eye image, a right eye image, a right eye image, a left eye image, a left eye image, a right eye image, a right eye image, . . . ", or a blank section may be inserted between the repeated images.

The backlight unit 130 may be disposed on a rear surface of the image display panel 120 to provide a backlight thereto. The backlight unit 130 may be classified into various types according to the kinds of light sources. The light sources of the backlight unit 130 may be any of cold cathode fluorescent lamps (CCFL), light emitting diodes (LED), flat fluorescent lamps (FFL), hot cathode fluorescent lamps (HCFL), etc. According to one or more exemplary embodiments, these light sources may be configured in a direct type where the light sources are evenly distributed across the backlight unit 130 or in an edge type where the light sources are arranged on one or more edges of the backlight unit 130.

The phase shift panel 110 carries out a shift operation, which alternately shifts a polarization direction of light outputted from the image display panel 120. Specifically, the phase shift panel 110 shifts the polarization direction of light to a first polarization state from a point of time when one of the left eye image and the right eye image is displayed and shifts the polarization direction to a second polarization state from a point of time when the other of the left eye image and the right eye image is displayed. The first polarization state and the second polarization state may have a difference in angle of 90 degrees to each other. For instance, if the first polarization state corresponds to an angle of 0 degrees, the second polarization state may correspond to an angle of 90 degrees, and if the first polarization state corresponds to an angle of −45 degrees, the second polarization state may correspond to an angle of +45 degrees.

The shift operation may be carried out using different methods according the types or configurations of the phase shift panel 110.

As an example, the phase shift panel 110 may include a liquid crystal display (LCD) panel. In this case, liquid crystals are arranged in one direction, but if applied with an electric field, are rearranged to polarize the light in a direction vertical to the previously arranged direction according to a magnitude and a direction of the electric field. Accordingly, the shift operation in which the polarization direction of light is changed in an angle of 90 degrees is carried out in the present exemplary embodiment.

As another example, the phase shift panel 110 may be configured to include a first polarizer and a second polarizer, which are disposed side by side while respectively having polarization directions forming an angle of 90 degrees to each other. In this case, the shift operation in which the first polarizer and the second polarizer are alternately turned on and off to change the polarization direction of light in the angle of 90 degrees may be carried out. However, it is understood that exemplary embodiments are not limited to the above-described configurations, and the phase shift panel 110 may include, without limitation, any linear polarizer, birefringent polarizer, thin-film polarizer, circular polarizer, etc.

Furthermore, the backlight unit 130 is turned off for a crosstalk period, which is until a point before the phase shift panel 110 finishes the shift operation, and is turned on for a stabilization period after the crosstalk period.

Such a driving of the backlight unit 130 may be controlled by a control unit 200 external or internal to the 3D display panel 100.

The control unit 200 transmits a control signal for the backlight unit 130 to the backlight unit 130 itself or to a driving circuit (not shown) that drives the backlight unit 130, to thereby control the backlight unit 130 to be turned off for the crosstalk period. According to a control of the control signal, the backlight is not provided for a period when the left eye image and the right eye image are overlapped with each other, thereby preventing a phenomenon where a picture is distorted.

On the other hand, although in FIG. 1 the control unit 200 is shown as being provided outside the 3D display panel 100, it is understood that the control unit 200 may be provided inside the 3D display panel 100 along therewith. Further, the 3D display panel 100 may include the phase shift panel 110 and the image display panel 120 without the backlight unit 130. According to one or more exemplary embodiments, the 3D display panel may be disposed inside of the housing of a display device (e.g., a television set) while the control unit 200 is external to the housing.

Figure 2:
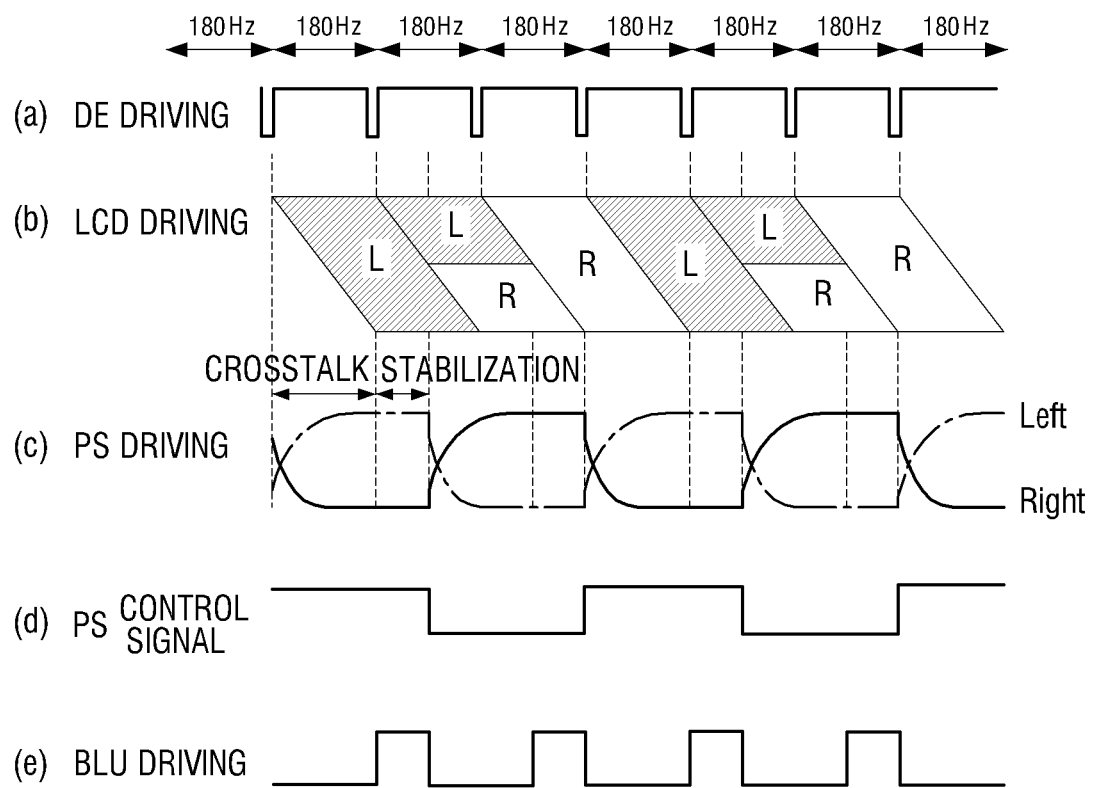
FIG. 2 is a view for explaining an operation of a 3D display panel and a 3D display apparatus, according to an exemplary embodiment.

FIG. 2 is a view for explaining an operation of a 3D display apparatus according to an exemplary embodiment.

In FIG. 2, (a) shows that data enable (DE) sections are formed according to an operating frequency of 180 Hz.

In FIG. 2, (b) shows an operation of the image display panel 120 during each data enable section. Referring to (b) of FIG. 2, the image display panel 120 outputs one image frame at one data enable section. The image frames are successively scanned in lines. Accordingly, at a next data enable section after a scanning for a last line of one image frame has begun, a next image frame is again outputted from a first line. In this case, after a left eye image L is displayed by a predetermined number of frames, a right eye image R is displayed at the following data enable section. Such a type switching may take place in one data enable section according to a difference between an operating frequency of the phase shift panel 110 and an operating frequency of the image display panel 120. In other words, referring to (b) of FIG. 2, in the middle of a second data enable section, an output of the right eye image R begins. After that, in the middle of a fifth data enable section, an output of the right eye image R begins again.

The phase shift panel 110 carries out the shift operation, which changes the polarization direction of light in synchronization with output timings of the left eye image and the right eye image. To be specific, for example, if an output of the right eye image begins, the phase shift panel 110 makes a +90 degree-polarization to thus transmit the light only through a right glass that allows only the +90 degree-polarization to pass, among the left glass and right glass of glasses worn by a user for viewing the images. In this case, the left glass does not transmit the light. In contrast, if an output of the left eye image begins, the phase shift panel 110 makes a 0 degree-polarization to thus transmit the light only through the left glass that allows only the 0 degree-polarization to pass and to block the light passing through the right eye glass.

In FIG. 2, (d) shows a form of the control signal, which is supplied to the phase shift panel 110, and (c) shows a shift state of the phase shift panel 110 by the control signal. According to (c) of FIG. 2, the phase shift panel 110 has a crosstalk period where both the light of the left eye image and the light of the right eye image may be displayed from a point of time when the shift begins to a point of time when the shift is accomplished beyond some extent. After the crosstalk period, the phase shift panel 110 has a stabilization period where any one of the light of the left eye image and the light of the right eye image is blocked.

According to (e) of FIG. 2, the backlight unit 130 is turned off for the crosstalk period and turned on for the stabilization period. Accordingly, during the crosstalk period, a phenomenon where the left eye image and the right eye image are overlapped with each other is prevented, and during the stabilization period, the light of image that is currently displayed on the image display panel 120 is projected toward viewers as is. If after the stabilization period, the operation of the phase shift panel 110 begins again, the backlight unit 130 is turned off.

As shown in FIG. 2, the image display panel 120 outputs the left eye image and the right eye image according to the operating frequency of 180 Hz, but the phase shift panel 110 carries out the shift operation according to a relatively lower operating frequency as compared with the image display panel 120. To be specific, the operating frequency of the phase shift panel 110 may be 120 Hz and the operating frequency of the image display panel 120 may be 180 Hz, 240 Hz, 360 Hz, 480 Hz, or the like.

As above, if the operating frequency of the phase shift panel 110 is set lower than that of the image display panel 120, a stabilization period over a certain length of time can be established.

On the other hand, although the operating frequency of the phase shift panel 110 is lower than that of the image display panel 120 as described above, the phase shift panel 110 may begin the shift from the same point of time as that of the image display of the image display panel 120.

In other words, the phase shift panel 110 may first begin the shift in synchronization with a point of time of vertical sync of the image display panel 120. In this case, the operating frequencies are different thus not to harmonize the vertical sync each time, but the vertical sync harmonizes again when a certain time passes. As an example, if the operating frequency of the phase shift panel 110 is 120 Hz and the operating frequency of the image display panel 120 is 180 Hz, the phase shift panel 110 carries out a third shift operation at a point of time where a fourth frame is outputted from the image display panel 110.

On the other hand, to establish the more lengthened stabilization period, the phase shift panel 110 may be overdriven. For example, if the phase shift panel 110 is embodied as the LCD panel, the liquid crystals are driven according to a voltage, and the higher the voltage is, the faster the response speed is. Accordingly, if a voltage higher than a normal state, that is, an overdrive voltage, is applied to the phase shift panel 110 for a predetermined time from a point of time where the shift operation begins, the crosstalk period is relatively shortened and thus the stabilization period is lengthened.

The size of the overdrive voltage may be arbitrarily set. As an example, after a voltage where the phase shift panel 110 comes to a full white state is used as the overdrive voltage and applied to the phase shift panel 110, the phase shift panel 110 may be applied with a regular-size maintenance voltage when a certain time passes. In other words, if the phase shift panel 110 has an attribute of 255 gradations, a voltage for formulating the 255 gradations as the overdrive voltage may be supplied to the phase shift panel 110 and after that, a voltage corresponding to 240 gradations as the maintenance voltage may be supplied to the phase shift panel 110.

Figure 3:
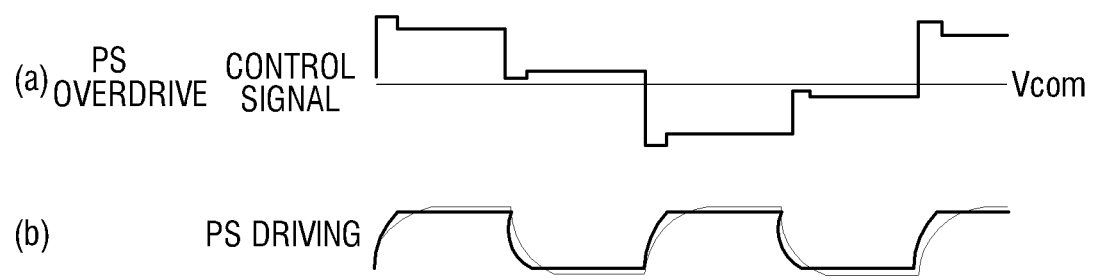
FIG. 3 is a view for explaining a method of overdriving a phase shift panel according to an exemplary embodiment.

FIG. 3 is a view for explaining a control signal for overdriving a phase shift panel 110 and a shift operation of the phase shift panel 110 according thereto, according to an exemplary embodiment.

Referring to (a) in FIG. 3, after raised by a size of +overdrive voltage, the control signal is descended to a level of a maintenance voltage when a certain time passes. After that, in a next shift section, the control signal is pulled to a level of voltage Vcom, which is a reference voltage, and when a certain time passes again, is slightly increased. In a next section, a control signal in a reverse form on the basis of the reference voltage is supplied and the shift operation is carried out.

In FIG. 3, in sections where the control signal has a higher voltage value and a lower voltage value than the reference voltage Vcom, the liquid crystals of the phase shift panel 110 move and come to a black state, that is, a first polarization state. In contrast, in sections where the control signal has a voltage value close to the reference voltage Vcom, the liquid crystals of the phase shift panel 110 return to an original state and come to a white state, that is, a second polarization state where the light is polarized vertical to the first polarization state. As described above, when the control signal having + and − values based on the reference voltage is used, the liquid crystals are alternately applied with voltages having reverse polarities, thereby allowing a deterioration thereof to be minimized in speed.

When the overdrive voltage is used as shown in (a) of FIG. 3, the phase shift panel 110 comes to more quickly enter the stabilization period as shown in (b) of FIG. 3.

Figure 4:
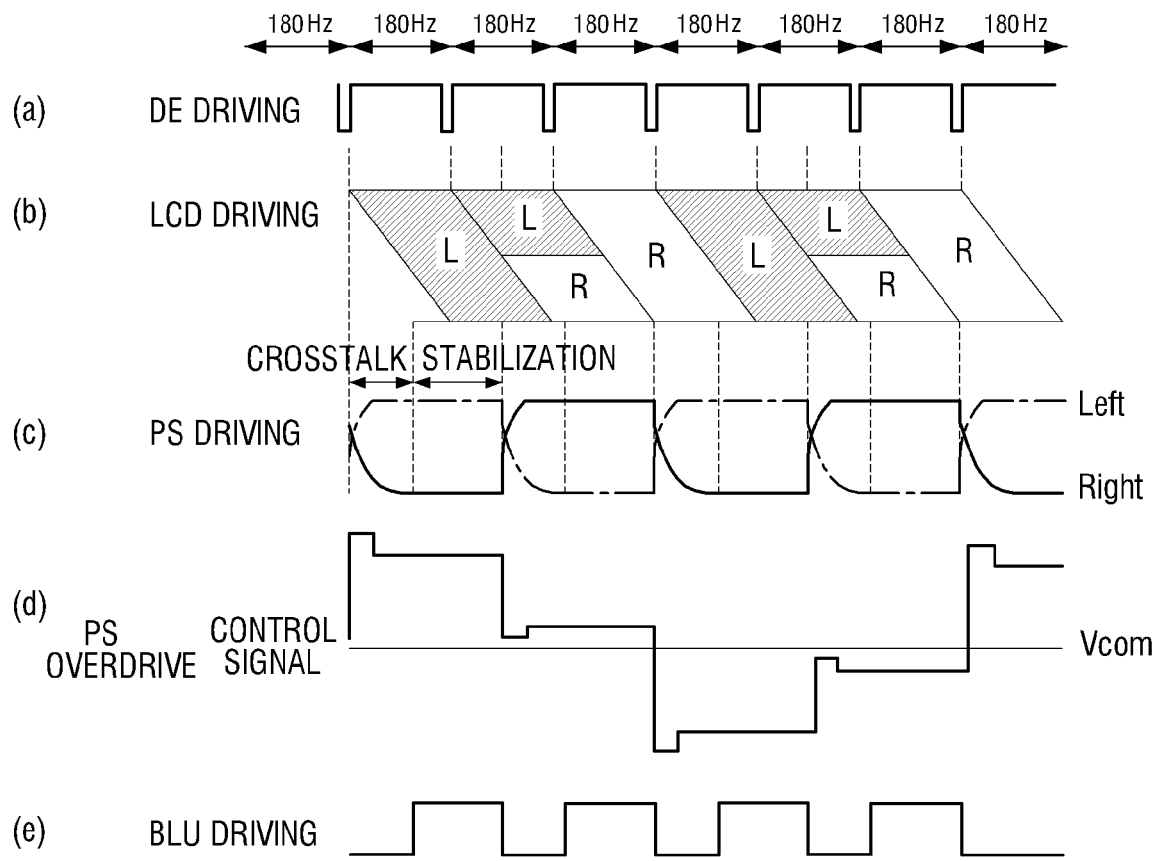
FIG. 4 is a view for explaining an operation of a 3D display panel and a 3D display apparatus, according to an example of controlling a driving of a backlight unit while overdriving a phase shift panel, according to an exemplary embodiment.

FIG. 4 is a view for explaining an operation of a 3D display panel when an overdrive as described is performed according to an exemplary embodiment. In FIG. 4, since (a) and (b) are the same as those in FIG. 2, redundant explanations thereof will be omitted.

Referring to (c) in FIG. 4, it can be appreciated that due to the overdrive, the crosstalk period is relatively shortened and the stabilization period is relatively lengthened.

Accordingly, as shown in (e) of FIG. 4, a turning-on time of the backlight unit 130 is relatively lengthened as compared with that in FIG. 2.

In the various exemplary embodiments as described above, the phase shift panel 110 may not carry out the shift operation divided into a plurality of segments, but may carry out the shift operation by one frame. If one phase shift panel 110 is divided into the plurality of segments to differently begin shift operations of the segments according to an image display degree of the phase shift panel 110, border interfaces between the segments may be shown in the form of lines.

For this reason, in one or more exemplary embodiments, the phase shift panel 110 carries out the shift once by one frame.

Figure 5:
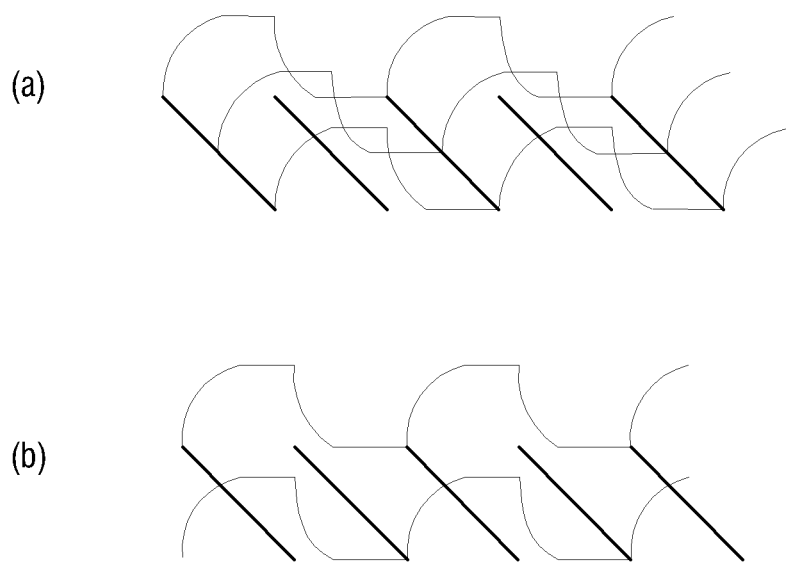
FIGS. 5A and 5B are views for explaining a method in which a phase shift panel carries out a shift operation by a frame unit, according to an exemplary embodiment.

FIGS. 5A and 5B are views for explaining a method where a phase shift panel 110 carries out a shift operation by a frame unit, according to an exemplary embodiment.

Referring to FIG. 5A, a process of dividing and shifting one phase shift panel 110 into and in three segments is shown. As shown, after a first segment of the phase shift panel 110 is shifted, a second segment and a third segment are successively shifted when a certain time passes.

In contrast, referring to FIG. 5B, the one phase shift panel 110 is shifted while one frame is outputted. According to this, a phenomenon that border interfaces between the segments are shown in the form of lines may be prevented.

Figure 6:
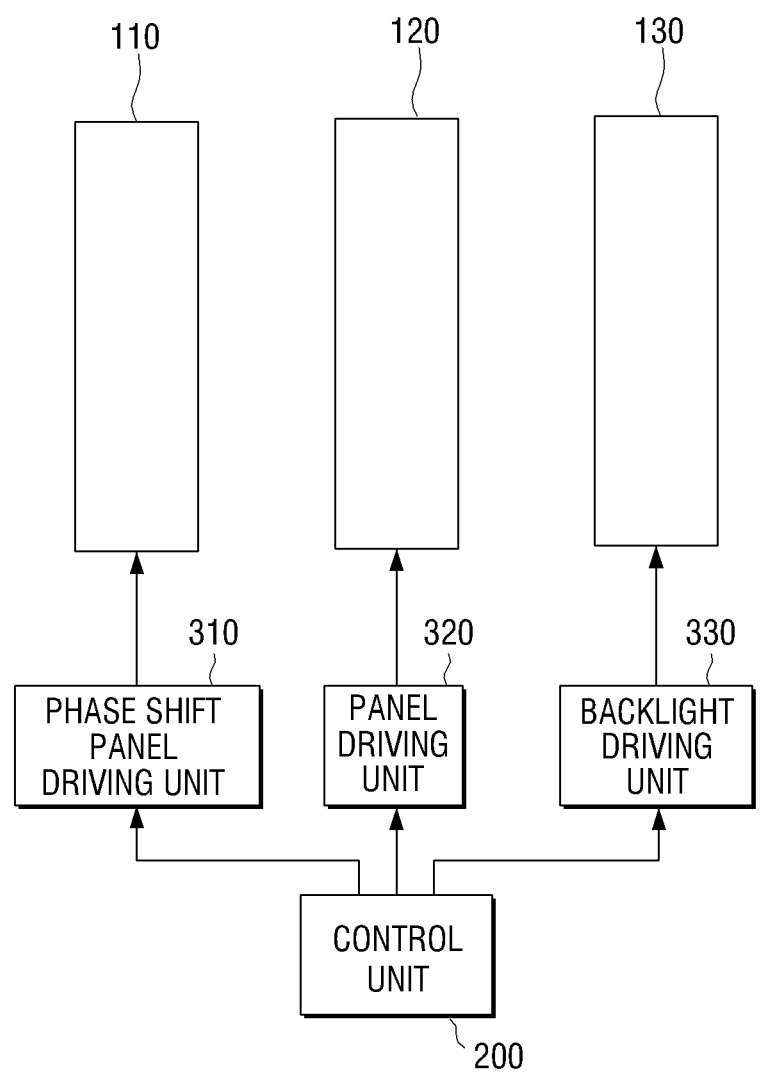
FIG. 6 is a block diagram for explaining a detailed configuration of a 3D display panel and a 3D display apparatus, according to an exemplary embodiment.

FIG. 6 is a block diagram showing an example of a detailed configuration of a 3D display apparatus, according to an exemplary embodiment. Referring to FIG. 6, the 3D display apparatus includes a phase shift panel 110, an image display panel 120, a backlight unit 130, a phase shift panel driving unit 310, a panel driving unit 320, a backlight driving unit 330, and a control unit 200.

Since the phase shift panel 110, the image display panel 120 and the backlight unit 130 are the same as or similar to those of FIG. 1, redundant explanations thereof will be omitted.

The phase shift panel driving unit 310 has a configuration which controls the shift operation of the phase shift panel 110. The phase shift panel driving unit 310 outputs a control signal for controlling the phase shift panel 110. The control signal may be applied in the form of control pulses to the phase shift panel 110. In this case, the control signal, as shown in FIGS. 3 and 4, may be generated and supplied to the phase shift panel 110 to overdrive the phase shift panel.

The panel driving unit 320 has a configuration which controls an operation of the image display panel 120. To be specific, to display an image processed by an image processor (not shown) through the respective liquid crystals in the image display panel 120, the panel driving unit 320 supplies a variety of control signals, such as an address voltage, a data voltage, etc.

The backlight driving unit 330 has a configuration which controls the backlight unit 130. The backlight driving unit 330 controls so that the backlight unit 130 is turned off while the phase shift panel 110 is in the crosstalk period and turned on while the phase shift panel 110 is in the stabilization period.

In FIG. 6, the operations of the phase shift panel driving unit 310, the panel driving unit 320 and the backlight driving unit 330 may be controlled by the control unit 200.

Figure 7:
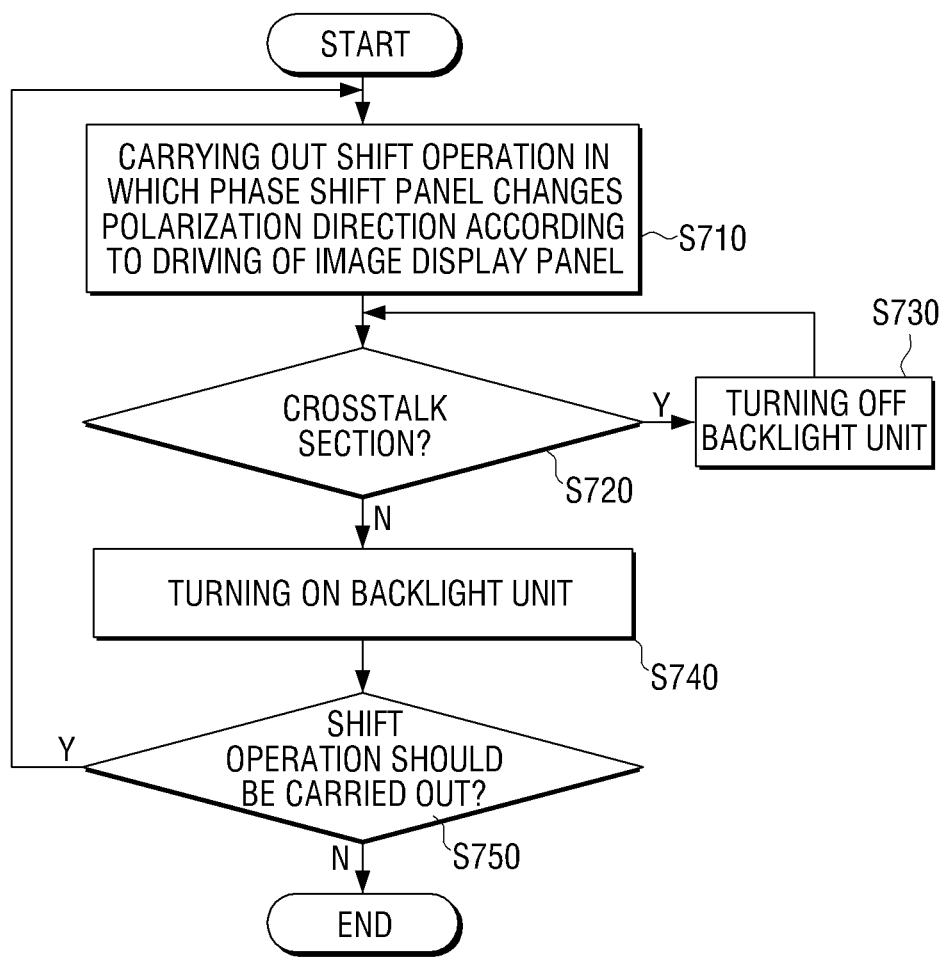
FIG. 7 is a flowchart for explaining a driving method of a 3D display apparatus according to an exemplary embodiment.

FIG. 7 is a flowchart for explaining a driving method of a 3D display apparatus, according to one or more exemplary embodiments.

Referring to FIG. 7, the 3D display apparatus carries out a shift operation where the phase shift panel changes a polarization direction according to a driving of the image display panel (operation S710). In this case, according to an exemplary embodiment, the phase shift panel may be embodied to overdrive for a predetermined time from a point of time where the shift operation begins, thereby allowing the crosstalk period to be shortened. Further, the phase shift panel may be embodied to carry out the shift operation by one frame.

Accordingly, if the shift operation begins to enter a crosstalk period (operation S720: Y), the backlight unit is turned off (operation S730).

Then, if the crosstalk period elapses to enter a stabilization period (operation S720: N), the backlight unit is turned on (operation S740).

Subsequently, if a condition where the shift operation is to be carried out again occurs (operation S750: Y), the operations as described above are repeatedly carried out. In contrast, if an output of the images is terminated so as not to require the shift operation, the driving operation is stopped (operation S750: N).

As described above, the phase shift panel and the backlight unit can be properly controlled taking into consideration the image display state of the image display panel, the shift state of the phase shift panel, etc., thereby preventing a phenomenon where the left eye image and the right eye image are shown while overlapped with each other even in the polarization type 3D display apparatus.

Further, the shift operation can be carried out by a frame unit, thereby preventing noises, such as lines, from being displayed on the picture.

Furthermore, according to one or more exemplary embodiments, program codes for carrying out the driving method as described above may be stored in various types of recording media. For example, the program codes may be stored in any of a random access memory (RAM), a flashy memory, a read only memory (ROM), an erasable programmable ROM (EPROM), an electronically erasable programmable ROM (EEPROM), a resistor, a hard disk, a removable disk, a memory card, a USB memory, a CD-ROM, etc., which are readable in a terminal.

Accordingly, if the recording media in which the program codes as described above are recorded are connected or mounted in the 3D display apparatus, the 3D display apparatus can support the driving method as described above.

It is understood that the present inventive concept is not limited to the foregoing exemplary embodiments described above. The present teaching can be readily applied to other types of apparatuses and many alternatives, modifications, and variations will be apparent to those skilled in the art. Thus, the scope of the present inventive concept is not to be construed as being limited to the description of exemplary embodiments, and is to be construed by the attached claims and equivalents.

What is claimed is:

1. A three-dimensional (3D) display apparatus, comprising:
    an image display panel which outputs one image frame per data enable section;
    a phase shift panel which performs a shift operation by a unit of a frame, which is more than one data enable section, to alternately shift a polarization direction of light outputted from the image display panel;
    a backlight unit which provides a backlight for the image display panel; and
    a control unit which turns off the backlight unit during a crosstalk period when the phase shift panel performs the shift operation and which turns on the backlight unit during a stabilization period after the crosstalk period,
    wherein for a sequence of three data enable sections, the backlight unit is turned on once for a left eye unit of a frame and once for a right eye unit of a frame.

2. The apparatus of claim 1, further comprising:
    a phase shift panel driving unit which overdrives the phase shift panel for a predetermined period of time from a point of time when the phase shift panel begins the shift operation.

3. The apparatus of claim 2, wherein the phase shift panel driving unit overdrives the phase shift panel by controlling to apply an overdrive voltage to the phase shift panel for the predetermined period of time, and controls to apply a maintenance voltage, less than the overdrive voltage, to the phase shift panel from an end of the predetermined period of time until the stabilization period ends.

4. The apparatus of claim 1, wherein an operating frequency of the phase shift panel is 120 Hz, and an operating frequency of the image display panel is 180 Hz, 240 Hz, 360 Hz, or 480 Hz.

5. The apparatus of claim 1, wherein the image display panel alternately outputs a left eye image and a right eye image, and the phase shift panel shifts the polarization direction of the light to a first polarization state from a point of time when the left eye image beings to be displayed and shifts the polarization direction to a second polarization state, vertical to the first polarization state, from a point of time when the right eye image begins to be displayed.

6. The apparatus of claim 1, wherein an operating frequency of the phase shift panel is lower than that of the image display panel so that a stabilization period over a certain length of time is established.

7. The apparatus of claim 1, wherein the phase shift panel performs the shift operation each time a frame is output.

8. A three-dimensional (3D) display panel, comprising:
    an image display panel which outputs one image frame per data enable section;
    a phase shift panel which performs a shift operation by a unit of a frame, which is more than one data enable section, to shift a polarization direction of light outputted from the image display panel to a first polarization state from a point of time when a left eye image begins to be displayed and shifts the polarization direction of the light to a second polarization state from a point of time when a right eye image begins to be displayed; and
    a backlight unit operable to be turned off during a crosstalk period when the phase shift panel performs the shift operation and to be turned on during a stabilization period after the crosstalk period,
    wherein for a sequence of three data enable sections, the backlight unit is turned on once for a left eye unit of a frame and once for a right eye unit of a frame.

9. The panel of claim 8, wherein the phase shift panel is overdriven for a predetermined period time from a point of time when the phase shift panel begins the shift operation.

10. The panel of claim 8, wherein an operating frequency of the phase shift panel is 120 Hz, and an operating frequency of the image display panel is 180 Hz, 240 Hz, 360 Hz or 480 Hz.

11. The panel of claim 8, wherein the phase shift panel comprises a first polarizer which shifts the polarization direction of the light to the first polarization state and a second polarizer, adjacent to the first polarizer, which shifts the polarization direction of the light to the second polarization state.

12. The panel of claim 8, wherein the phase shift panel is a polarizer, a liquid crystal panel, or a film.

13. The panel of claim 8, wherein:
the shift operation begins approximately when a drive voltage is applied to the phase shift panel to change a state of the phase shift panel from a first state, in which the light is output in the first polarization state, to a second state, in which the light is output in the second polarization state; and
the shift operation ends approximately when the phase shift panel reaches the second state.

14. A driving method of a backlight unit for a three-dimensional (3D) display apparatus having an image display panel that outputs one image frame per data enable section, and a phase shift panel which performs a shift operation by a unit of a frame, which is more than one data enable section, to alternately shift a polarization direction of light outputted from the image display panel, the method comprising:
turning off the backlight unit during a crosstalk period when the phase shift panel performs the shift operation; and
turning on the backlight unit when the image display panel finishes the phase shift operation to enter a stabilization period,
wherein the turning off the backlight unit comprises turning off the backlight unit during the crosstalk period where both a left eye image and a right eye image is displayed, and
wherein for a sequence of three; data enable sections. the turning on the backlight unit includes turning on the backlight unit once for a. left ye unit of a frame once for a right eye unit of a frame.

15. The method of claim 14, further comprising:
overdriving the phase shift panel for a predetermined period of time when the phase shift panel begins the shift operation.

16. The method of claim 14, further comprising:
alternately displaying a left eye image and a right eye image on the image display panel; and
shifting the polarization direction of the light to a first polarization state from a point of time when the left eye image begins to be displayed and shifting the polarization direction of the light to a second polarization state, vertical to the first polarization state, from a point of time when the right eye image begins to be displayed.

17. A computer readable recording medium having recorded thereon a program executable by a computer for performing the method of claim 14.

18. A backlight unit for a three-dimensional (3D) display apparatus having an image display panel that outputs one image frame per data enable section, and a phase shift panel which performs a shift operation by a unit of a frame, which is more than one data enable section, to alternately shift a polarization direction of light outputted from the image display panel, the backlight unit comprising:
a light source which provides a backlight for the image display panel; and
a control unit which turns off the light source during a crosstalk period corresponding to when the phase shift panel performs the shift operation, and which turns on the light source during a stabilization period after the crosstalk period,
wherein for a sequence of three data enable sections, the backlight unit is turned on once for a left eye unit of a frame and once for a right eye unit of a frame.

19. A three-dimensional (3D) display control apparatus for controlling a 3D display apparatus having an image display panel that outputs one image frame per data enable section, a phase shift panel which performs a shift operation by a unit of a frame, which is more than one data enable section, to alternately shift a polarization direction of light outputted from the image display panel, and a backlight unit, the control apparatus comprising:
a backlight driving unit which outputs a control signal to turn off the backlight unit during a crosstalk period corresponding to when the phase shift panel performs the shift operation, and to turn on the light source during a stabilization period after the crosstalk period,
wherein for a sequence of three data enable sections, the backlight unit is turned on once for a left eye unit of a frame and once for a right eye unit of a frame.

20. The control apparatus of claim 19, further comprising:
a phase shift panel driving unit which outputs a phase control unit to overdrive the phase shift panel for a predetermined period of time from a point of time when the phase shift panel begins the shift operation.

* * * * *